(12) United States Patent
Miura et al.

(10) Patent No.: US 7,817,402 B2
(45) Date of Patent: Oct. 19, 2010

(54) MULTILAYER CERAMIC ELECTRONIC DEVICE AND METHOD OF PRODUCTION OF THE SAME

(75) Inventors: Shuichi Miura, Chuo-ku (JP); Kazuhiko Oda, Chuo-ku (JP); Tetsuji Maruno, Chuo-ku (JP)

(73) Assignee: TDK Corporation, Tokyo (JP)

( * ) Notice: Subject to any disclaimer, the term of this patent is extended or adjusted under 35 U.S.C. 154(b) by 130 days.

(21) Appl. No.: 11/387,863

(22) Filed: Mar. 24, 2006

(65) Prior Publication Data

US 2006/0221547 A1 Oct. 5, 2006

(30) Foreign Application Priority Data

Mar. 31, 2005 (JP) ............... 2005-103509
Jan. 18, 2006 (JP) ............... 2006-010339

(51) Int. Cl.
*H01G 4/008* (2006.01)
*H01G 4/005* (2006.01)

(52) U.S. Cl. .................. 361/305; 361/303; 361/311; 29/25.42

(58) Field of Classification Search ......... 361/303–305, 361/311
See application file for complete search history.

(56) References Cited

U.S. PATENT DOCUMENTS

| | | | | |
|---|---|---|---|---|
| 5,877,934 A | * | 3/1999 | Sano et al. | 361/312 |
| 6,141,846 A | * | 11/2000 | Miki | 29/25.42 |
| 6,723,280 B2 | * | 4/2004 | Coppola | 419/35 |
| 6,785,121 B2 | * | 8/2004 | Nakano et al. | 361/321.2 |
| 6,982,047 B2 | * | 1/2006 | Uchida | 252/513 |
| 2004/0099847 A1 | * | 5/2004 | Miura | 252/500 |
| 2006/0171099 A1 | * | 8/2006 | Barber et al. | 361/321.2 |
| 2006/0234854 A1 | * | 10/2006 | Watanabe et al. | 501/136 |

FOREIGN PATENT DOCUMENTS

| | | | | |
|---|---|---|---|---|
| JP | 59114703 | A | * | 7/1984 |
| JP | 63201079 | A | * | 8/1988 |
| JP | A-64-81106 | | | 3/1989 |
| JP | A-2-106808 | | | 4/1990 |
| JP | 03074819 | A | * | 3/1991 |
| JP | 04345670 | A | * | 12/1992 |
| JP | A-5-205969 | | | 8/1993 |
| JP | A-6-236707 | | | 8/1994 |
| JP | 06290985 | A | * | 10/1994 |
| JP | 07197103 | A | * | 8/1995 |
| JP | A-8-255509 | | | 10/1996 |
| JP | A-11-185527 | | | 7/1999 |
| JP | A 2000-269073 | | | 9/2000 |
| JP | 2001284162 | A | * | 10/2001 |
| JP | 2001307941 | A | * | 11/2001 |
| JP | 2002299833 | A | * | 10/2002 |
| JP | A-2005-129425 | | | 5/2005 |
| SU | 870383 | B | * | 10/1981 |

* cited by examiner

*Primary Examiner*—Eric Thomas
(74) *Attorney, Agent, or Firm*—Oliff & Berridge, PLC

(57) ABSTRACT

A multilayer ceramic capacitor 1 having dielectric layers 2 and internal electrode layers 3 formed using a conductor paste, wherein the conductor paste contains a conductive material, the conductive material is comprised of a first ingredient and second ingredient, the first ingredient includes metal elements having Ni as a main ingredient, and the second ingredient includes a metal element dissolving in the first ingredient and having a melting point of 1490° C. or more.

8 Claims, 3 Drawing Sheets

SAMPLE 9

SAMPLE 6

MULTILAYER CERAMIC ELECTRONIC DEVICE AND METHOD OF PRODUCTION OF THE SAME

BACKGROUND OF THE INVENTION

1. Field of the Invention

The present invention relates to a multilayer ceramic capacitor or other multilayer ceramic electronic device having internal electrode layers formed using a specific composition of conductor paste and a method of production of such a device.

2. Description of the Related Art

A multilayer ceramic capacitor, an example of a multilayer ceramic electronic device, is comprised of a element body structured by dielectric layers and internal electrode layers alternately stacked in a plurality of layers and a pair of external end electrodes formed at the two ends of the element body. This multilayer ceramic capacitor is produced by first alternately stacking pre-firing dielectric layers (ceramic green sheets) and pre-firing internal electrode layers (predetermined patterns of electrode layer conductor paste) in the necessary number of layers to produce a pre-firing element body, then firing this and forming a pair of external end electrodes at the two ends of the pre-firing element body.

When producing a multilayer ceramic capacitor, the pre-firing dielectric layers and pre-firing internal electrode layers are simultaneously fired, so the conductive material included in the pre-firing internal electrode layers is required to have a melting point higher than the sintering temperature of the dielectric material powder included in the pre-firing dielectric layer, to not react with the dielectric material powder, to not diffuse in the fired dielectric layer, etc.

In recent years, to satisfy these requirements, for the conductive material included in the pre-firing internal electrode layers, the conventionally used Pt, Pd, and other precious metals have been replaced by reducing the sintering temperature of the dielectric material powder and using Ag—Pd alloy for the conductive material included in the pre-firing internal electrode layers or by imparting reduction resistance to the dielectric material and using Ni or other inexpensive base metal able to be fired in a reducing atmosphere.

The case of use of Ni for the conductive material included in the pre-firing internal electrode layers will be illustrated. Ni is lower in melting point compared with the dielectric material powder included in the pre-firing dielectric layer. For this reason, when simultaneously firing the pre-firing dielectric layers and the pre-firing internal electrode layers including Ni as the conductive material, due to the difference in sintering start temperature between the dielectric material powder and Ni, along with the progress in sintering of the dielectric material powder, the Ni grains grow and in the end the layers tend to break. As a result, the coverage rate of the internal electrodes tends to fall.

Therefore, to suppress grain growth of Ni due to firing, that is, to impart an Ni sintering suppression effect, and, as a result, improve the coverage rate of the internal electrodes and further improve the bondability between the Ni internal electrodes and dielectric layers, the practice has been to add to the conductor paste for forming the internal electrode layers the dielectric material (for example, barium titanate powder) included in the dielectric layers for co-material.

However, if the amount of addition of the co-material in the conductor paste is too great, the sintering suppression effect and the bondability between the Ni internal electrodes and dielectric layers are improved, but the continuity of the Ni internal electrodes facing each other across the dielectric layers tends to deteriorate. As a result, Ni neck growth occurs, the Ni concentrates in stripe shapes resulting in a sparse conductor structure of the internal electrodes, and the coverage rate of internal electrodes drops making it impossible to obtain a large electrostatic capacity.

On the other hand, in cases where the amount of addition of the co-material in the conductor paste is too small, the coverage rate of the internal electrode does not drop, so a large electrostatic capacity can be obtained, but a sufficient sintering suppression effect and bondability of the Ni internal electrodes and dielectric layers can no longer be obtained and cracks are also caused.

To obtain a larger electrostatic capacity with a small size, both the internal electrodes and dielectric layers have to be made as thin as possible (reduction of thickness) and as many of these as possible stacked (increase of layers), but if just reducing the thickness and increasing the layers of the internal electrodes and dielectric layers, the ratio of the internal electrodes inside the pre-firing element body increases and more of the co-material has to be added to the conductor paste. However, if the amount of the co-material added to the conductor paste becomes greater due to the above reasons, the desired electrostatic capacity can no longer be obtained.

Therefore, in recent years, means for obtaining the desired electrostatic capacity without adding a large amount of co-material have been proposed (see Japanese Patent Publication (A) No. 2000-269073).

Japanese Patent Publication (A) No. 2000-269073 proposes the technology of adding to the conductor paste used for forming the internal electrodes additives having an Ni sintering suppression effect, that is, an oxide of at least La and Cr ($La_2O_3$, $Cr_2O_3$) so as not to influence the continuity of the internal electrodes and as a result not reduce the electrostatic capacity even if reducing the amount of addition of the co-material. Note that Japanese Patent Publication (A) No. 2000-269073 discloses the average particle size of the additive being 0.5 μm or more. Further, it describes adding the above additive of this size in an amount, with respect to Ni powder as 100 wt %, of 0.5 wt % or more.

However, with the technology of Japanese Patent Publication (A) No. 2000-269073, the additive added to the Ni powder was large in average particle size and the amount of addition was great, so the continuity of the Ni internal electrodes became poorer. As a result, the coverage rate of the internal electrodes dropped and therefore a large electrostatic capacity could no longer be obtained in some cases.

SUMMARY OF THE INVENTION

An object of the present invention is to provide a multilayer ceramic capacitor or other multilayer ceramic electronic device having internal electrode layers which improves the continuity and as a result improves the coverage rate and a method of production of such a device.

Up until now, the conductor paste used for forming the internal electrodes of multilayer ceramic electronic devices has had to be suppressed in Ni grain growth, that is, has had to have Ni sintering suppression effect, in order to improve the coverage rate. The inventors discover that without regard to the evaluation of the Ni sintering suppression effect by the TMA analysis generally used for evaluation, by using conductor paste comprised of Ni (first ingredient) to which a fine grain specific second ingredient is added in a specific amount (or Ni on which a specific second ingredient is coated), it is possible to improve the continuity of the internal electrode layers after firing and as a result improve the coverage rate.

According to the present invention, there is provided a multilayer ceramic electronic device having dielectric layers and internal electrode layers formed using a conductor paste, wherein the conductor paste contains a conductive material, the conductive material is comprised of a first ingredient and second ingredient, the first ingredient includes metal elements having Ni as their main ingredient, and the second ingredient includes metal elements dissolving in the first ingredient and having a melting point of 1490° C. or more.

According to the present invention, there is provided a method of production of a multilayer ceramic electronic device firing a green ceramic stack comprised of conductor paste alternately stacked in predetermined patterns together with ceramic green sheets, wherein the conductor paste contains a conductive material, the conductive material is comprised of a first ingredient and second ingredient, the first ingredient includes metal elements having Ni as their main ingredients, and the second ingredient includes metal elements dissolving in the first ingredient and having a melting point of 1490° C. or more.

"Metal elements dissolving in the first ingredient and having a melting point of 1490° C. or more" preferably include at least one metal element selected from the group of Cr, Mo, W, Fe, Ru, Co, Rh, Zr, Pd, and Pt. Note that the second ingredient includes, in addition to these metal elements, oxides of these metal elements. As the oxides, for example, $Cr_2O_3$, $Co_3O_4$, $ZrO_2$, $Fe_2O_3$, etc. may be mentioned.

Preferably, the average particle size of the second ingredient is less than 0.5 μm.

Preferably, the average particle size of the second ingredient is less than 0.5 μm and 0.25 time or less the average particle size of the first ingredient.

Preferably, the average particle size of the second ingredient is 0.01 μm or more.

Preferably, the amount of addition of the second ingredient is, with respect to the first ingredient as 100 wt %, 10 wt % or less.

Preferably, the amount of addition of the second ingredient is, with respect to the first ingredient as 100 wt %, 0.05 wt % or more.

The multilayer ceramic electronic device is not particularly limited. A multilayer ceramic capacitor, multilayer ceramic inductor, multilayer ceramic LC parts, multilayer ceramic substrate, etc. may be mentioned.

According to the present invention, by using a conductor paste comprised of a first ingredient having Ni as its main ingredient to which a specific second ingredient having the smaller grain size is added in a specific amount, even when reducing the thickness of the internal electrode layers (for example, to 1.5 μm or less), it is possible to improve the continuity of the internal electrode layers after firing and as a result improve the coverage rate. This technology enables a multilayer ceramic electronic device realizing further reduction of thickness of the internal electrodes to be obtained. Note that similar effects can also be expected to be obtained by coating the first ingredient with the specific second ingredient.

BRIEF DESCRIPTION OF THE DRAWINGS

Below, embodiments of the present invention will be explained in further detail based on the drawings, where.

DESCRIPTION OF THE PREFERRED EMBODIMENTS

First, the overall configuration of a multilayer ceramic capacitor will be explained as a multilayer ceramic electronic device according to an embodiment of the present invention.

Figure 1:
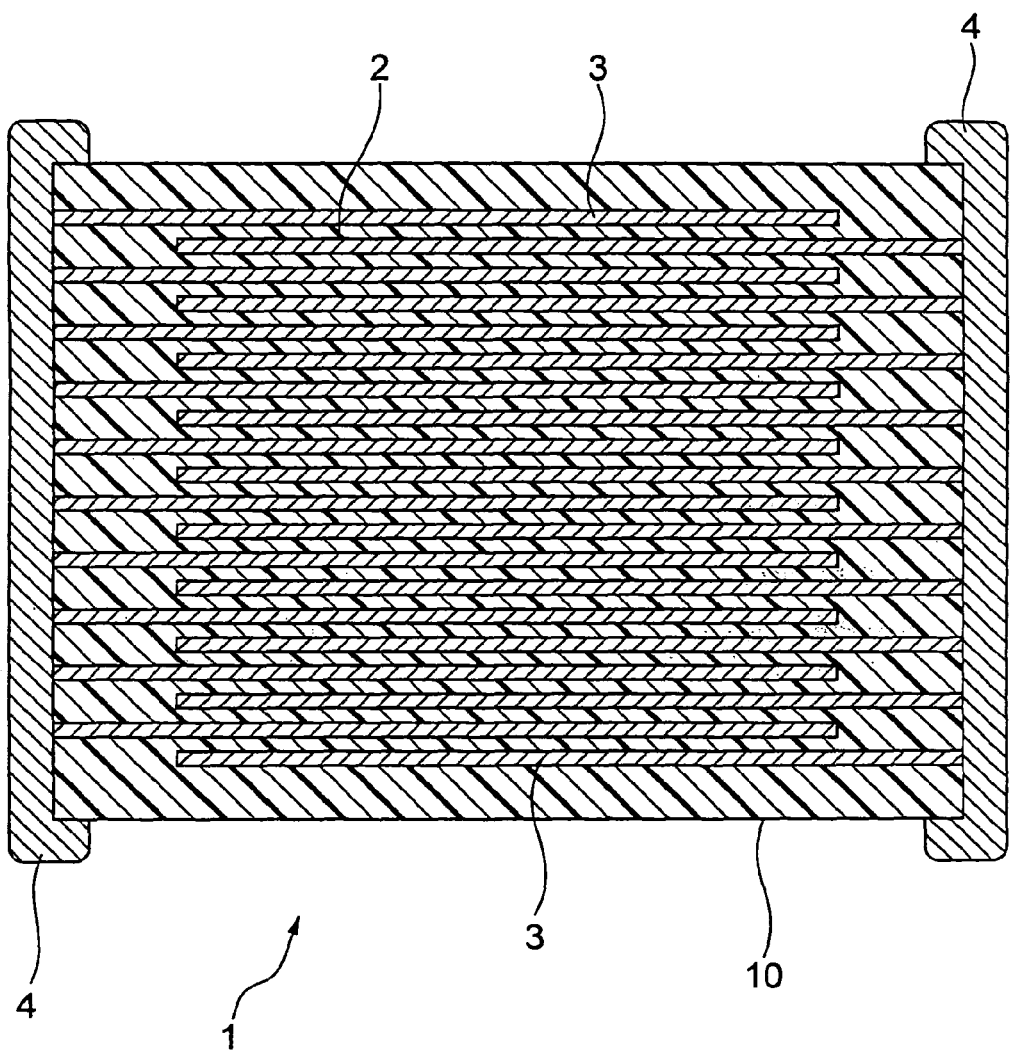
FIG. 1 is a sectional view of a multilayer ceramic capacitor according to an embodiment of the present invention.

As shown in FIG. 1, the multilayer ceramic capacitor 1 according to an embodiment of the present invention has a capacitor body 10 structured by dielectric layers 2 and internal electrode layers 3 alternately stacked. The capacitor body 10 is formed at its two ends with a pair of external electrodes 4, 4 respectively conducting to the internal electrode layers 3 alternately arranged inside the body 10. The internal electrode layers 3 are stacked so that the side end faces are alternately exposed at the surfaces of the two facing ends of the capacitor body 10. The pair of external electrodes 4, 4 are formed at the two ends of the capacitor body 10 and are connected to the exposed end faces of the alternately arranged internal electrode layers 3 to form the capacitor circuit.

The capacitor body 10 is not particularly limited in outside shape or dimensions. These can be suitably set in accordance with the application. Normally, the outside shape is substantially a parallelepiped shape. The dimensions may usually be a length of (0.4 to 5.6 mm)×width (0.2 to 5.0 mm)×height (0.2 to 1.9 mm) or so.

Dielectric layer 2 is formed by firing the later explained ceramic green sheet. Its material is not particularly limited. For example, it may be comprised of dielectric material such as calcium titanate, strontium titanate, and/or barium titanate. The thickness of the dielectric layer 2, in the present embodiment, is reduced to preferably 3 μm or less, more preferably 2 μm or less.

The internal electrode layers 3 are formed by firing the later explained predetermined patterns of conductor paste. The internal electrode layers 3 are reduced in thickness to preferably 1.5 μm or less, more preferably 1 μm or less. In general, if the electrode layers are too thick, the number of layers has to be reduced, the obtained capacity becomes smaller, and it is becomes hard to increase the capacity. On the other hand, if too thin, uniform formation is difficult and electrode disconnection easily occurs, but in the present invention, the later explained specific conductor paste is used to form the internal electrode layers 3, so even if the thickness of the layers is reduced to 1.5 μm or less, the continuity can be maintained and as a result the coverage rate of the internal electrode layers 3 is improved. Specifically, the coverage rate of the internal electrode layers 3 is 80% or more. In the past, when reducing the thickness of the internal electrode layers 3 to 1.5 μm or less, a coverage rate of 75% was the limit.

The external electrodes 4 are usually made of copper or a copper alloy, nickel or a nickel alloy, etc., but silver, an alloy of silver and palladium, etc. may also be used. The thickness of the external electrodes 4 is also not particularly limited, but is usually 10 to 50 μm or so.

Next, an example of a method of production of a multilayer ceramic capacitor 1 according to the present embodiment will be explained.

Preparation of Dielectric Paste (1) First, to produce the ceramic green sheet forming the dielectric layers 2 shown in FIG. 1 after firing, a dielectric paste is prepared.

The dielectric paste is usually comprised of an organic solvent-based paste or water-based paste obtained by kneading a ceramic powder (dielectric material) and an organic vehicle.

As the ceramic powder, it is possible to use one obtained by suitable selection and mixture from composite oxides and various types of compounds forming oxides such as carbonates, nitrates, hydroxides, organometallic compounds, etc. The ceramic powder usually is used as a powder of an average particle size of 0.4 µm or less, preferably 0.1 to 3.0 µm or so. Note that to form an extremely thin ceramic green sheet, it is preferable to use a powder finer than the ceramic green sheet thickness.

The organic vehicle is obtaind by dissolving a binder in an organic solvent. The binder used in the organic vehicle is not particularly limited. Ethyl cellulose, polyvinyl butyral, acryl resin, and other usual various types of binders may be used, but preferably polyvinyl butyral or another butyral-based resin is used.

Further, the organic solvent used for the organic vehicle is also not particularly limited, but terpineol, butyl carbitol, acetone, toluene, or another organic solvent may be used. Further, the vehicle in a water-based paste is obtaind by dissolving a water-soluble binder in water. The water-soluble binder is not particularly limited, but polyvinyl alcohol, methyl cellulose, hydroxyethyl cellulose, a water-soluble acryl resin, emulsion, etc. may be used. The contents of the ingredients in the dielectric paste are not particularly limited, but the usual contents are, for example, a binder of 1 to 5 wt % or so and a solvent (or water) of 10 to 50 wt % or so.

The dielectric paste may contain, in accordance with need, various types of additives selected from dispersants, plasticizers, dielectrics, glass frit, insulators, etc. However, the total content of these is preferably 10 wt % or less. When using a butyral-based resin as the binder resin, the plasticizer is preferably contained in an amount, with respect to the binder resin as 100 parts by weight, of 25 to 100 parts by weight. If the amount of the plasticizer is too small, the green sheet tends to become brittle, while if too great, the plasticizer seeps out and handling is difficult.

Formation of Ceramic Green Sheet (2) Next, this dielectric paste is coated by the doctor blade method etc. on the carrier sheet to a thickness of preferably 0.5 to 30 µm, more preferably 0.5 to 10 µm, furthermore preferably 0.5 to 5 µm or so to form a ceramic green sheet. The ceramic green sheet forms the dielectric layer 2 shown in FIG. 1 after firing.

As the carrier sheet, for example a PET film etc. is used. To improve the releasability, it is preferably coated with silicone etc. The carrier sheet is not particularly limited in thickness, but preferably is 5 to 100 µm.

The ceramic green sheet is formed on the carrier sheet, then dried. The drying temperature of the ceramic green sheet is preferably 50 to 100° C., while the drying time is preferably 1 to 20 minutes.

The dried ceramic green sheet shrinks in thickness, compared with before drying, to 5 to 25%. In the present embodiment, the dried ceramic green sheet is formed to a thickness of 5 µm or less, preferably 3 in or less. This is so as to meet the demands for reduced thickness desired in recent years.

Formation of Electrode Layer (3) Next, the ceramic green sheet formed on the carrier sheet is formed on its surface with predetermined patterns of an electrode layer (internal electrode patterns) forming the internal electrode layers 3 shown in FIG. 1 after firing.

The electrode layer is formed so that the thickness after firing becomes preferably 1.5 µm or less, more preferably 1 µm or less.

The electrode layer has a thickness of the above range or so in the current technology, but is preferably as thin as possible to an extent not causing electrode disconnection.

The method of forming the electrode layer is not particularly limited so long as it is a method which can form a layer uniformly, but in the present embodiment, the screen printing method using an electrode layer paste (conductor paste) is used.

The conductor paste used in the present embodiment contains a conductive material and an organic vehicle.

The conductive material is comprised of a first ingredient and second ingredient.

The first ingredient is a powder in form and is comprised of metal elements having Ni as a main ingredient. The ratio of the Ni included in the first ingredient, assuming the first ingredient as a whole as 100 wt %, is preferably 99 to 100 wt %, more preferably 99.5 to 100 wt %.

The first ingredient preferably has a small average particle size from the viewpoint of reducing the thickness of the internal electrode layers. Specifically, when the first ingredient is spherical in shape, the average particle size is preferably less than 0.5 µm, more preferably 0.3 µm or less. If the first ingredient has an average particle size of 0.5 µm or more, the coverage rate of the capacitor internal electrodes is liable to drop. The lower limit of the average particle size of the first ingredient is preferably 0.01 µm. If the first ingredient is too small in average particle size, the capacitor 1 is liable to crack.

The second ingredient includes metal elements dissolving in the first ingredient and having a melting point of 1490° C. or more. By using this second ingredient together with the first ingredient, the coverage rate of the capacitor internal electrodes is improved.

Specifically, as the metal elements included in the second ingredient, one or more metal elements selected from the group of Cr (1857° C.), Mo (2620° C.), W (3380° C.), Fe (1540° C.), Ru (2310° C.), Co (1490° C.), Rh (1970° C.), Zr (2410° C.), Pd (1550° C.), and Pt (1770° C.) may be mentioned. Among these, one or more metal elements selected from the group of Cr, Mo, W, Fe, Co, Zr, and Pd is preferable. More preferable is one or more metal elements selected from the group of Cr, Mo, and W, furthermore preferable is one or more metal elements selected from the group of Cr and Mo. Particularly preferable is Cr. Cr is close in atomic radius to the main ingredient Ni of the first ingredient and can be used most preferably in combination with Ni. Note that the numerals in parentheses indicate the melting points of the metals. By way of reference, the main ingredient Ni of the first ingredient has a melting point of 1450° C.

Note that as the second ingredient, in addition to the above metal elements themselves, it may be contained in a state of their oxides in the conductor paste. As oxides of the metal elements, for example, $Cr_2O_3$, $Co_3O_4$, $ZrO_2$, $Fe_2O_3$, etc. may be mentioned.

When the second ingredient is spherical in shape, its average particle size is preferably less than 0.5 µm, more preferably 0.1 µm or less, furthermore preferably 0.25 time or less the average particle size of the first ingredient. If the second ingredient has an average particle size of 0.5 µm or more, the coverage rate of the capacitor internal electrodes is liable to drop. In particular, by making the average particle size of the second ingredient less than 0.5 µm and 0.25 time or less the average particle size of the first ingredient, the coverage rate of the capacitor internal electrodes is further improved. The lower limit of the average particle size of the second ingredient is preferably 0.01 μm. If the second ingredient is too small in average particle size, the second ingredient strongly aggregates, so the dispersion ability is poor and maintaining uniformity of dispersion of the conductor paste is difficult, so the effect of improvement of the coverage rate of the capacitor internal electrodes drops.

The amount of addition of the second ingredient with respect to the first ingredient as 100 wt % is preferably 10 wt % or less. Even if the amount of addition of the second ingredient is over 10 wt %, while there is an effect of improvement of the coverage rate of the capacitor internal electrodes, it tends to be blunted and it is liable to make the capacitor 1 crack. That is, by making the amount of addition 10 wt % or less, it is possible to effectively improve the coverage rate of the capacitor internal electrodes without making the capacitor 1 crack. The lower limit of the amount of addition of the second ingredient is preferably 0.05 wt %. If the second ingredient is too small in amount of addition, the effect of improvement of the coverage rate of the capacitor internal electrodes is liable to become insufficient.

The second ingredient may be contained in the form of a powder or may be contained in the form of a metal resinate. A "metal resinate" is a metal resin acid salt. A higher fatty acid metal salt is a typical example. As a metal resinate, for example, a naphthenate, octylate, stearate, oleate, palmitate, laurate, myristate, benzoate, paratolylate, n-decanoate, metal alkoxide, metal acetyl acetonate, etc. may be used.

The conductive material is included in the conductor paste in an amount of preferably 30 to 60 wt %, more preferably 40 to 50 wt %.

The organic vehicle used may be one similar to the case of the above-mentioned dielectric paste.

The conductor paste used in the present embodiment may contain, in addition to the above-mentioned conductive material and organic vehicle, a ceramic powder the same as the ceramic powder contained in the dielectric paste as a co-material. The co-material exhibits the effect of suppressing sintering of the conductive material in the firing process. The ceramic powder (co-material) is contained in the conductor paste in an amount, with respect to the conductive material as 100 parts by weight, of preferably 5 to 30 parts by weight. If the amount of the co-material is too small, the sintering suppression effect of the conductive material drops, the linearity (continuity) of the internal electrodes deteriorates, and the apparent permittivity drops. On the other hand, if the amount of the co-material is too great, the linearity of the internal electrodes deteriorates and the apparent permittivity also tends to drop.

To improve the bondability, the conductor paste may also contain a plasticizer. As the plasticizer, benzylbutyl phthalate (BBP) or another phthalic acid ester, adipic acid, phosphoric acid ester, glycols, etc. may be mentioned.

The conductor paste may be obtained by kneading the above ingredients by a ball mill etc. to make a slurry.

Preparation, Firing, Etc. of Green Chip (4) Next, a plurality of green sheets formed with the above predetermined patterns of electrode paste layers on its surface are stacked to prepare a green chip. This is treated to remove the binder, fired, and in accordance with need annealed to form a sintered body. The thus formed capacitor body 10 is printed or transferred with external electrodes paste which is then fired to form external electrodes 4, 4 and thereby produce a multilayer ceramic capacitor 1.

Above, an embodiment of the present invention was explained, but the present invention is not limited to the above-mentioned embodiment in any way and can be modified in various ways within a scope not departing from the gist of the present invention.

For example, in the above-mentioned embodiment, as the electronic device according to the present invention, a multilayer ceramic capacitor was illustrated, but the multilayer ceramic electronic device according to the present invention is not limited to a multilayer ceramic capacitor and may also be applied to a multilayer ceramic substrate etc. of course.

EXAMPLES

Below, the present invention will be explained based on further detailed examples, but the present invention is not limited to these examples.

Example 1

Preparation of Conductor Paste

First, the first ingredient of the conductive material constituted by Ni powder of an average particle size of 0.4 μm, the second ingredient of the conductive material constituted by $Cr_2O_3$ powder of an average particle size of 0.008 to 1 μm, an organic binder constituted by ethyl cellulose, and a solvent constituted by terpineol were prepared.

Next, 0.03 to 20 wt % of $Cr_2O_3$ powder with respect to 100 wt % of Ni powder was weighed out, while 5 wt % of organic binder and 100 wt % of solvent with respect to the conductive material (Ni powder+$Cr_2O_3$ powder) were weighed out. These were kneaded by a ball mill to a slurry to obtain a conductor paste.

Preparation of Dielectric Paste

A $BaTiO_3$-based ceramic powder, an organic binder constituted by polyvinyl butyral (PVB), and a solvent constituted by methanol were prepared. Next, 10 wt % of organic binder and 150 wt % of solvent with respect to the ceramic powder were weighed out and kneaded by a ball mill to a slurry to obtain a dielectric paste.

Preparation of Multilayer Ceramic Capacitor Samples

Next, the obtained dielectric paste and conductor paste were used in the following way to produce the multilayer ceramic capacitor 1 shown in FIG. 1.

First, a PET film was coated with the dielectric paste by the doctor blade method to a predetermined thickness and dried to form a 1 μm thick ceramic green sheet. In the present example, this ceramic green sheet was used as the first green sheet. A plurality of these was prepared.

Next, the obtained first green sheet was formed with the conductor paste by the screen printing method in predetermined patterns to obtain a ceramic green sheet having approximately 1 μm thick electrode patterns. In the present example, this ceramic green sheet was used as the second green sheet. A plurality of these was prepared.

Next, the first green sheets were stacked to a thickness of 150 μm to form a group of green sheets. On this group of green sheets, 250 second green sheets were stacked. On this, a similar group of green sheets was stacked. The result was heated and pressed under conditions of a temperature of 70° C. and a pressure of 1.5 ton/cm$^2$ to obtain a green ceramic stack.

Next, the obtained stack was cut into a predetermined size, then treated to remove the binder, fired, and annealed to obtain a sintered body.

The binder was removed under conditions of a rate of temperature rise of 5 to 300° C./hour, a holding temperature of 200 to 400° C., a holding time of 0.5 to 20 hours, and an atmospheric gas of wet $N_2$. The firing was performed under conditions of a rate of temperature rise of 5 to 500° C./hour, a holding temperature of 1200° C., a holding time of 0.5 to 8 hours, a cooling rate of 50 to 500° C./hour, an atmospheric gas of a mixed gas of wet $N_2$ and $H_2$, and an oxygen partial pressure of $10^{-7}$ Pa. The annealing (reoxidation) was performed under conditions of a rate of temperature rise of 200 to 300° C./hour, a holding temperature of 1050° C., a holding time of 2 hours, a cooling rate of 300° C./hour, an atmospheric gas of wet $N_2$ gas, and an oxygen partial pressure of $10^{-1}$ Pa. Note that atmospheric gas was wet using a wetter at a water temperature of 0 to 75° C.

The obtained sintered body had a size of a length: 1.6 mm×width: 0.8 mm×height: 0.8 mm. The thickness of each dielectric layer 2 sandwiched between a pair of internal electrode layers was about 1 μm, while the thickness of the internal electrode layers 3 was 1 μm.

Evaluation of Sintered Body

The obtained sintered body was used to evaluate the coverage rate of the internal electrode layers. The coverage rate of the internal electrode layers (unit: %) was obtained by splitting the obtained sintered body so that the entire surface of any internal electrode layer was exposed, then photographing the exposed internal electrode layer using a "Superdepth Color 3D Shape Measurement Microscope VK-9500" (made by Keyence) magnified 1000-fold, then calculating the coverage rate from the histogram of that image. In the present example, the bright regions in the range were deemed to be covered by Ni. In the present example, the coverage rate is 80% or more as "good". The results are shown in Table 1.

Figure 2:
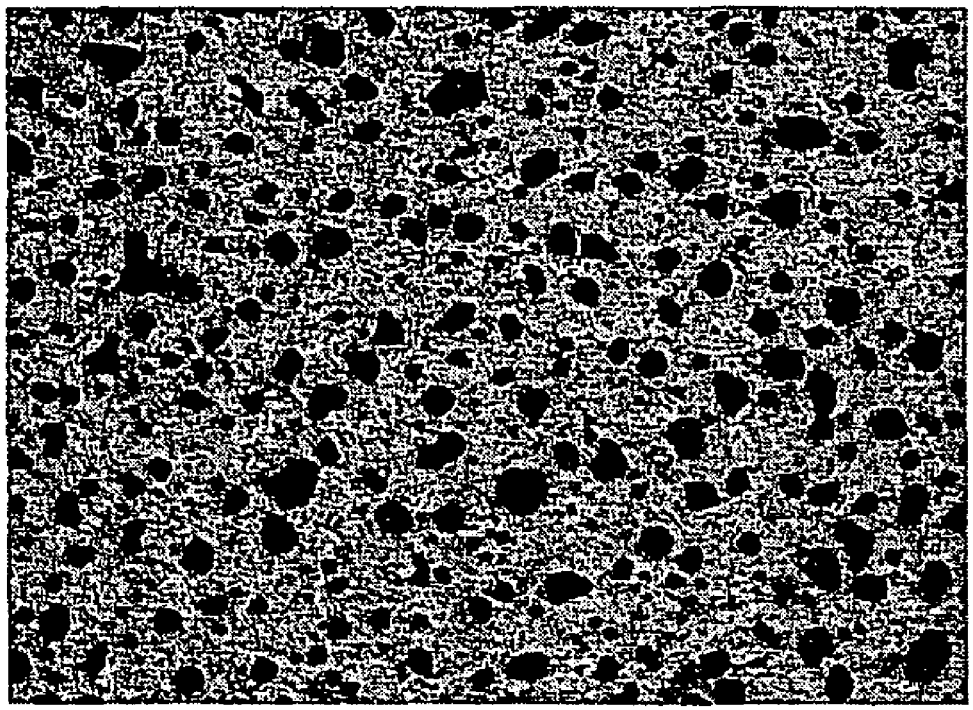
FIG. 2 is a photograph used for calculation of the coverage rate of internal electrode layers for a typical example sample of the present invention (Sample 9)
Figure 3:
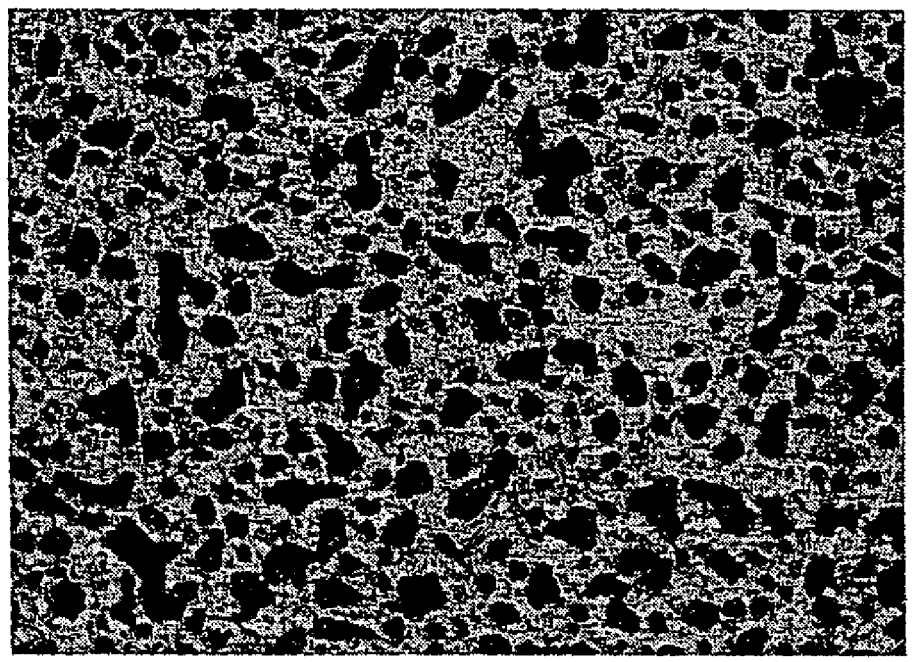
FIG. 3 is a photograph used for calculation of the coverage rate of internal electrode layers for a typical comparative sample of the present invention (Sample 6).

Further, the photographed images of the exposed internal electrode layers of the typical Example Sample 9 and Comparative Sample 6 are shown in FIG. 2 and FIG. 3.

Next, the obtained sintered body was polished at its end faces by sandblasting, then In—Ga alloy was coated to form test electrodes and obtain a multilayer ceramic capacitor sample.

Evaluation of Capacitor Samples

The obtained capacitor samples were evaluated for electrostatic capacity and cracks.

The electrostatic capacity C (unit: nF) was measured for each sample at a reference temperature of 25° C. by a digital LCR meter (YHP 4274A) under conditions of a frequency of 1 kHz and an input signal level (measurement voltage) of 1 Vrms. The electrostatic capacity C is preferably 1.93 nF or more as "good".

The presence of cracks was evaluated by observing the outer appearance of the capacitor sample or by polishing to expose the internal structure and observing it by a metal microscope.

No crack is deemed "good". The results are shown in Table 1.

TABLE 1

| Sample no. | 2nd ingredient | | | Coverage rate (%) | Capacitor sample | | Judgment |
|---|---|---|---|---|---|---|---|
| | Type | Grain size (μm) | Amount added (wt %) | | electrostatic capacity (nF) | Cracks | |
| 1 | A | 0.008 | 1 | 77.2 | 1.85 | Yes | Poor |
| 2 | A | 0.01 | 1 | 84.2 | 2.02 | None | Good |
| 3 | A | 0.1 | 1 | 87.9 | 2.12 | None | Good |
| 4 | A | 0.4 | 1 | 83.2 | 2.01 | None | Good |
| 5 | A | 1 | 1 | 75.6 | 1.82 | None | Poor |
| 6 | $Cr_2O_3$ | 0.1 | 0.03 | 78.6 | 1.89 | None | Poor |
| 7 | $Cr_2O_3$ | 0.1 | 0.05 | 81.1 | 1.94 | None | Good |
| 7-1 | $Cr_2O_3$ | 0.1 | 0.1 | 82.3 | 1.98 | None | Good |
| 7-2 | $Cr_2O_3$ | 0.1 | 0.4 | 85.1 | 2.05 | None | Good |
| 8(=3) | $Cr_2O_3$ | 0.1 | 1 | 87.9 | 2.12 | None | Good |
| 9 | $Cr_2O_3$ | 0.1 | 10 | 88.1 | 2.13 | None | Good |
| 10 | $Cr_2O_3$ | 0.1 | 20 | 85.4 | 2.05 | Yes | Poor |

In Table 1, Sample 8 is a sample the same as Sample 3.

As shown in Table 1, (1) if the second ingredient constituted by the $Cr_2O_3$ powder has an average particle size of an overly large 1 μm, cracks do not occur, but the coverage rate and electrostatic capacity become lower (Sample 5). Conversely, if the average particle size is a too small 0.008 μm, the coverage rate and electrostatic capacity fall and cracks occur (Sample 1). As opposed to this, if the average particle size is less than 0.5 μm, the coverage rate and electrostatic capacity do not fall and no cracks occur (Sample 2 to 4).

(2) Even with $Cr_2O_3$ powder of an average particle size of a fine 0.1 μm, if the amount of addition is an overly large 20 wt % whit respect to 100 wt % of Ni powder (first ingredient), the coverage rate and electrostatic capacity do not drop, but the effect of improvement of the coverage rate tends to be blunted and cracks occur (Sample 10). Conversely, if the amount of addition is a too small 0.03 wt %, cracks do not occur, but the coverage rate and electrostatic capacity become lower (Sample 6). As opposed to this, if the amount of addition is 10 wt % or less, the coverage rate and electrostatic capacity do not fall and cracks do not occur (Sample 7 to 9).

Example 2

Except for using as the second ingredient of the conductive material, instead of $Cr_2O_3$ powder, Mo powder of an average particle size of 0.01 to 0.45 μm and making the amount of addition of the Mo power, with respect to the Ni powder as 100 wt %, 0.05 to 12 wt %, the same procedure was followed as in Example 1 to prepare multilayer ceramic capacitor samples and evaluation was made in the same way as Example 1. The results are shown in Table 2.

TABLE 2

| Sample no. | 2nd ingredient | | | Capacitor sample | | | Judgment |
|---|---|---|---|---|---|---|---|
| | Type | Grain size (μm) | Amount added (wt %) | Coverage rate (%) | electrostatic capacity (nF) | Cracks | |
| 11 | Mo | 0.01 | 1 | 83.0 | 1.98 | None | Good |
| 12 | Mo | 0.1 | 1 | 85.6 | 2.05 | None | Good |
| 13 | Mo | 0.45 | 1 | 82.4 | 1.91 | None | Good |
| 14 | Mo | 0.1 | 0.05 | 80.8 | 1.94 | None | Good |
| 15(=12) | Mo | 0.1 | 1 | 85.6 | 2.05 | None | Good |
| 16 | Mo | 0.1 | 10 | 85.4 | 2.04 | None | Good |
| 17 | Mo | 0.1 | 12 | 82.3 | 1.97 | Yes | Poor |

In Table 2, sample 15 is a sample the same as sample 12.

From Table 2, it could be confirmed that even when using as the second ingredient, instead of $Cr_2O_3$ powder, Mo powder, similar effects can be obtained.

Example 3

Except for using as the second ingredient of the conductive material, instead of $Cr_2O_3$ powder, W, $Co_3O_4$, $ZrO_2$, Pd, $Fe_2O_3$, Ru, Rh, and Pt powder, the same procedure was followed as with sample 3 of Example 1 to prepare multilayer ceramic capacitor samples and evaluation was made in the same way as in Example 1. The results are show in Table 3.

$ZrO_2$, Pd, $Fe_2O_3$, Ru, Rh, and Pt powder, similar effects can be obtained. Note that the samples of Table 3 are samples using as the second ingredient powders of an average particle size of 0.1 to 0.2 μm in range and added in amounts of 1 wt % in each case. From the results of table 3, when using as the second ingredient $Cr_2O_3$, Mo, $Co_3O_4$, $ZrO_2$, Pd, and $Fe_2O_3$, in particular when using $Cr_2O_3$ and Mo, it can be confirmed that the effect of improvement of the electrostatic capacity is high.

Example 4

Except for using as the conductive material Ni powder of an average particle size of 0.4 μm (first ingredient) on the surface of which $Cr_2O_3$ (second ingredient) is coated, the same procedure was followed as in Example 1 to prepare multilayer ceramic capacitor samples and evaluation was made in the same way as in Example 1. Note that as the coated powder, coated powder comprised of Ni: 100 wt % on which

TABLE 3

| Sample no. | 2nd ingredient | | | Capacitor sample | | | Judgment |
|---|---|---|---|---|---|---|---|
| | Type | Grain size (μm) | Amount added (wt %) | Coverage rate (%) | electrostatic capacity (nF) | Cracks | |
| 18(=3) | $Cr_2O_3$ | 0.1 | 1 | 87.9 | 2.12 | None | Good |
| 19(=12) | Mo | 0.1 | 1 | 85.6 | 2.05 | None | Good |
| 20 | W | 0.12 | 1 | 82.6 | 1.94 | None | Good |
| 21 | $Co_3O_4$ | 0.11 | 1 | 83.6 | 2.01 | None | Good |
| 22 | $ZrO_2$ | 0.13 | 1 | 84.6 | 2.04 | None | Good |
| 23 | Pd | 0.2 | 1 | 85.1 | 2.03 | None | Good |
| 24 | $Fe_2O_3$ | 0.12 | 1 | 83.1 | 1.99 | None | Good |
| 25 | Ru | 0.21 | 1 | 81.9 | 1.90 | None | Good |
| 26 | Rh | 0.1 | 1 | 82.1 | 1.91 | None | Good |
| 27 | Pt | 0.18 | 1 | 82.0 | 1.92 | None | Good |

In Table 3, sample 18 is a sample the same as sample 1 of Example 1, while sample 19 is a sample the same as the sample 12 of Example.

From Table 3, it can be confirmed that even when using as the second ingredient, instead of $Cr_2O_3$ powder, Mo, $Co_3O_4$, 1 wt % of $Cr_2O_3$ was coated was used. As a result, substantially the same evaluation results were obtained as with Example 1.

The invention claimed is:

1. A multilayer ceramic electronic device having dielectric layers and internal electrode layers formed using a conductor paste, wherein said conductor paste contains a conductive material, said conductive material is comprised of a first ingredient and second ingredient, said first ingredient is powdery Ni metal, and said second ingredient has average particle size of less than 0.5 μm and is at least one metal element or compound selected from the group consisting of Ru metal, Rh metal, oxide thereof, resinate thereof, Co resinate, Cr resinate, Pd oxide, Pd resinate, Fe resinate, Mo oxide, Mo resinate, W oxide and W resinate.

2. The multilayer ceramic electronic device as set forth in claim 1, wherein the average particle size of said second ingredient is 0.25 time or less the average particle size of said first ingredient.

3. The multilayer ceramic electronic device as set forth in claim 1, wherein the average particle size of said second ingredient is 0.01 μm or more.

4. The multilayer ceramic electronic device as set forth in claim 1, wherein the amount of addition of said second ingredient is, with respect to said first ingredient as 100 wt %, 10 wt % or less.

5. The multilayer ceramic electronic device as set forth in claim 4, wherein the amount of addition of said second ingredient is, with respect to said first ingredient as 100 wt %, 0.05 wt % or more.

6. The multilayer ceramic electronic device as set forth in claim 1, wherein said second ingredient is selected from the group consisting of Ru metal and Rh metal.

7. A method of production of a multilayer ceramic electronic device firing a green ceramic stack comprised of conductor paste alternately stacked in predetermined patterns together with ceramic green sheets, wherein said conductor paste contains a conductive material, said conductive material is comprised of a first ingredient and second ingredient, said first ingredient is powdery Ni metal, and said second ingredient has average particle size of less than 0.5 μm and is at least one metal or compound selected from the group consisting of Ru metal, Rh metal, oxide thereof, resinate thereof, Co resinate, Cr resinate, Pd oxide, Pd resinate, Fe resinate, Mo oxide, Mo resinate, W oxide and W resinate.

8. The method of production of a multilayer ceramic electronic device as set forth in claim 7, wherein said second ingredient is selected from the group consisting of Ru metal and Rh metal.

* * * * *